March 23, 1937.  R. S. TATUM  2,074,628
SPRING SCALE
Filed Sept. 27, 1935
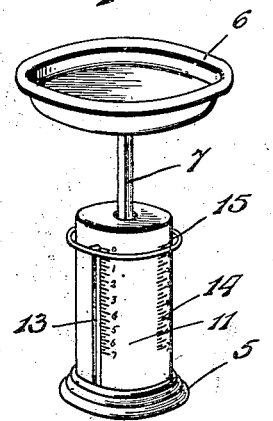
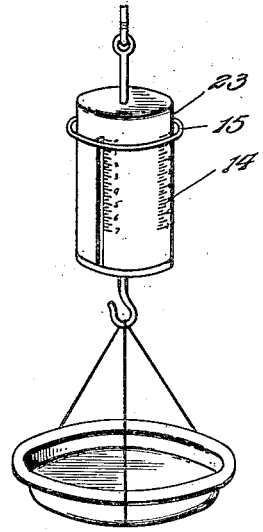
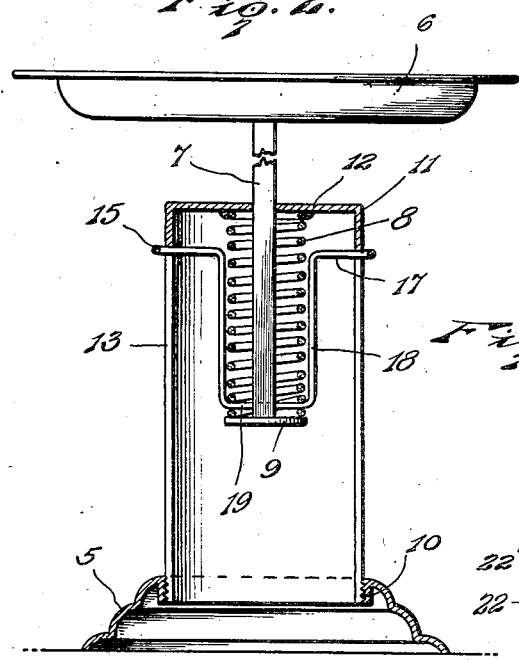
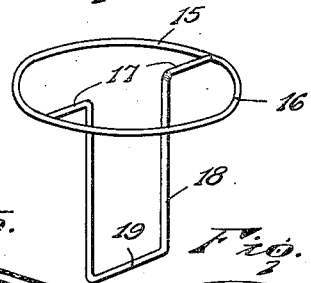
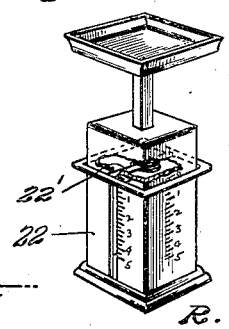
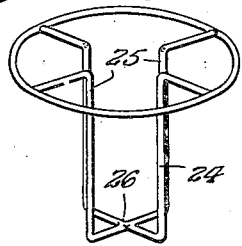
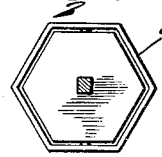
Inventor
R. S. Tatum.
By Lacey & Lacey
Attorney Patented Mar. 23, 1937

2,074,628

UNITED STATES PATENT OFFICE 2,074,628

SPRING SCALE

Robert S. Tatum, East Orange, N. J.

Application September 27, 1935, Serial No. 42,503

2 Claims. (Cl. 265—63)

This invention relates to weighing scales of the spring type and more particularly to means whereby the exact weight of a commodity may be readily seen when the scale is viewed from any angle.

The object of the invention is to provide a spring scale, the casing of which is provided with a plurality of rows of scale graduations disposed at spaced intervals thereon and over which travels an indicating ring operatively connected with the spring of the scale so that when a commodity is weighed, the exact weight thereof will be indicated at several points in the circumference of the casing and thus enable a storekeeper or attendant, as well as a purchaser standing at the front or at the side of the scale, to observe the exact reading thereof.

A further object is to provide a spring scale, the pointer or indicator of which is in the form of a ring or annulus having inwardly extending guide arms terminating in a depending yoke, the base of which fits between adjacent convolutions of the weighing spring, said guide arms being slidably mounted in vertical slots in the casing whereby to prevent canting of the ring and thus insure accurate and like reading on each series of graduations.

A further object is to provide an indicating device which may be used in connection with any style of weighing scale without requiring any structural changes therein and which will not detract from the appearance of the scale or interfere in any manner with the weighing operation.

A still further object of the invention is generally to improve this class of devices so as to increase their utility, durability and efficiency.

In the accompanying drawing forming a part of this specification, and in which similar numerals of reference indicate corresponding parts in all the figures of the drawing, Figure 1 is a perspective view of a table or counter scale provided with indicating mechanism constructed in accordance with the present invention.

Figure 2 is an enlarged vertical sectional view of Figure 1.

Figure 3 is a perspective view of the indicator detached.

Figure 4 is a perspective view of a suspension scale equipped with the improved indicating mechanism.

Figure 5 is a similar view showing a table or counter scale, the casing of which is substantially rectangular in cross section and provided with the improved indicator.

Figure 6 is a transverse sectional view showing a scale, the casing of which is triangular in cross section.

Figure 7 is a similar view showing a scale casing of hexagonal cross section.

Figure 8 is a perspective view illustrating a modified form of yoke.

The improved weight indicating means forming the subject-matter of the present invention may be used in connection with any style or type of scales and, by way of illustration, is shown in Figure 1 of the drawing applied to a table or counter scale of standard construction, in which 5 designates the supporting base, 6 the pen adapted to receive the articles to be weighed, and 7 the stem of the pan which extends through a coil spring 8 and is provided with a terminal disc 9 to which the lower end of the spring is fastened in any suitable manner, as shown. Detachably secured to the base 5 by threads 10 is a casing or housing 11 preferably cylindrical in shape and having its upper end closed at 12 and against which the adjacent end of the coil spring 8 is secured in any suitable manner. Formed in the casing at diametrically opposite points thereof are vertical guide slots 13 and disposed at opposite sides of the guide slots and arranged at spaced predetermined intervals around the entire circumference of the casing are a plurality of graduated scales 14 which coact with an indicating ring or annulus 15 to indicate the weight of an article placed in the pan 6. The indicating ring or annulus 15 is preferably formed of a single strand of wire or other suitable material, the ends of which are welded or otherwise united at 16 and secured to and extending inwardly from the ring or annulus are oppositely disposed arms 17 terminating in a depending yoke 18. The bottom or cross bar 19 of the yoke extends between the adjacent convolutions of the spring 8 near the disc 9 so that when the spring is expanded under the weight of an object placed in the pan, a corresponding movement will be imparted to the indicating ring or annulus 15. The arms 17 extend through the slots 13 and serve to guide the ring and prevent canting thereof so that the exact weight of an article placed in the pan 6 will be accurately and simultaneously indicated on the several scales. By providing the casing with a plurality of spaced graduated scales over which the indicating ring or annulus simultaneously travels, a storekeeper or attendant, as well as a purchaser standing in front or at the side of the scale, may readily see the result of each weighing operation. In other words, the weight of a commodity placed in the pan 6 may be readily seen when the scale is viewed from any angle.

If desired, instead of making the casing cylindrical in shape, it may be made substantially triangular in cross section, as indicated at 20 in Figure 6, or hexagonal as indicated at 21 in Figure 7, and in which case each angular face or side of the casing will be provided with scale graduations over which the annulus or ring travels to indicate the weight of a commodity.

In some instances it may be preferred to make the casing rectangular in cross section and there is illustrated at 22 in Figure 5 of the drawing a scale constructed in this manner.

The device is also applicable to suspension scales and in Figure 4 of the drawing, I have indicated at 23 a suspension scale of a conventional type but having a plurality of sets of scale graduations on the exterior wall of the casing and over which the indicating ring or annulus 15 travels in the same manner as shown in Figure 2.

It will, of course, be understood that the casing of the scale may be of any desired cross sectional shape so long as the exterior of the casing is provided with spaced series of scale graduations which coact with a ring or annulus to simultaneously indicate on all of said scales the exact weight of a commodity. It will also be understood that instead of providing a single yoke 19, two of said yokes 24 and 25 may be provided with their cross bars intersecting at 26 and in which event additional slots 13 will be formed in the casing to accommodate the guide arms of the extra yoke, as best shown in Figure 8 of the drawing. Such a construction will assist in maintaining the annulus in a horizontal position and prevent wobbling thereof during the weighing operation.

If desired, however, the yoke or yokes may be dispensed with and the guide arms connected to form a transverse bar 22' extending between the adjacent convolutions of the spring, as shown in Figure 5 of the drawing.

Having thus described the invention, what is claimed as new is:

1. In a weighing scale, a stationary casing having oppositely disposed vertical guide slots and provided with a plurality of spaced graduated scales on the exterior wall thereof, a coiled spring disposed within the casing, a pan operatively connected with the spring, an indicating annulus entirely surrounding the exterior of the casing and movable over the graduated scales, and a depending U-shaped yoke of less width than the diameter of the annulus disposed within the casing and extending between adjacent convolutions of the spring, said yoke forming a seat for the spring and having its upper ends provided with laterally extending arms slidably mounted within the guide slots and rigidly connected with the indicating annulus.

2. In a weighing scale, a stationary casing having vertically disposed guide slots formed therein and provided with a plurality of spaced graduated scales, a coiled spring disposed within the casing, a pan operatively connected with the spring, an indicating annulus entirely surrounding the casing and movable over the graduated scales, and a depending U-shaped yoke of less width than the diameter of the annulus disposed within the casing and including intersecting bars extending between adjacent convolutions of the spring, said yoke forming a seat for the spring and having the upper ends of its intersecting bars bent laterally to form arms slidably mounted within the guide slots and rigidly connected with the indicating annulus.

ROBERT S. TATUM.